United States Patent
Xu et al.

(10) Patent No.: US 10,860,476 B2
(45) Date of Patent: Dec. 8, 2020

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Xinlei Xu, Beijing (CN); Jian Gao, Beijing (CN); Changyu Feng, Beijing (CN); Haiying Tang, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 16/199,602

(22) Filed: Nov. 26, 2018

(65) Prior Publication Data
US 2019/0332526 A1    Oct. 31, 2019

(30) Foreign Application Priority Data
Apr. 28, 2018   (CN) .......................... 2018 1 0398869

(51) Int. Cl.
*G06F 12/00*      (2006.01)
*G06F 12/02*      (2006.01)
(Continued)

(52) U.S. Cl.
CPC .......... *G06F 12/0246* (2013.01); *G06F 3/061* (2013.01); *G06F 3/0616* (2013.01); *G06F 3/0644* (2013.01); *G06F 3/0649* (2013.01); *G06F 3/0689* (2013.01); *G06F 9/5016* (2013.01); *G06F 2209/5011* (2013.01); *G06F 2212/7201* (2013.01); *G06F 2212/7208* (2013.01); *G06F 2212/7211* (2013.01)

(58) Field of Classification Search
CPC .. G06F 12/0246; G06F 3/0649; G06F 3/0644; G06F 3/061; G06F 3/0689; G06F 3/0616; G06F 9/5016; G06F 2209/5011; G06F 2212/7211; G06F 2212/7201; G06F 2212/7208
See application file for complete search history.

(56) References Cited

U.S. PATENT DOCUMENTS 8,935,446 B1    1/2015   Shilane et al.
9,189,402 B1   11/2015   Smaldone et al.
(Continued)

*Primary Examiner* — Kalpit Parikh
(74) *Attorney, Agent, or Firm* — BainwoodHuang

(57) ABSTRACT

State information indicates wear levels of respective storage devices and free spaces in the respective storage devices. In response to receiving a request for allocating storage space to the storage system from the storage resource pool, corresponding available spaces in the respective storage devices are determined on the basis of the wear level and the free spaces of the respective storage devices, here the corresponding available spaces represent storage spaces in the respective storage devices which are allocatable to the storage system. A group of storage devices are selected from a plurality of storage devices on the basis of the corresponding available spaces. Requested storage spaces are allocated to the storage system from available spaces in the group of storage devices. Thereby, wear levels of various storage devices in the resource pool may be balanced, and further the overall life of the resource pool may be prolonged.

21 Claims, 9 Drawing Sheets

(51) Int. Cl.
*G06F 3/06* (2006.01)
*G06F 9/50* (2006.01)

(56) References Cited

U.S. PATENT DOCUMENTS

| | | | |
|---|---|---|---|
| 9,189,414 | B1 | 11/2015 | Shim et al. |
| 9,336,143 | B1 | 5/2016 | Wallace et al. |
| 9,390,116 | B1 | 7/2016 | Li et al. |
| 9,594,770 | B1 * | 3/2017 | Kushmerick .......... G06F 9/5011 |
| 10,209,904 | B2 | 2/2019 | Himelstein et al. |
| 2003/0046270 | A1 * | 3/2003 | Leung ..................... G06F 16/13 |
| 2010/0257306 | A1 * | 10/2010 | Kawaguchi ........... G06F 3/0616 |
| | | | 711/103 |
| 2013/0179631 | A1 * | 7/2013 | Cepulis .............. G06Q 30/0631 |
| | | | 711/103 |
| 2015/0347245 | A1 * | 12/2015 | Andre ................. G06F 11/3034 |
| | | | 714/6.3 |
| 2016/0210044 | A1 | 7/2016 | Mitkar et al. |

\* cited by examiner

METHOD, APPARATUS AND COMPUTER PROGRAM PRODUCT FOR MANAGING STORAGE SYSTEM

BACKGROUND

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various implementations of the present disclosure relate to storage management, and more specifically, to a method, apparatus and computer program product for managing a storage system (e.g. Redundant Array of Independent Disks (RAID)), as well as a computer program product.

With the development of data storage techniques, various data storage devices now provide users with increasingly high data storage capacity, and also their data access speed has been improved greatly. With the increase of data storage capacity, users also impose greater demands on data reliability and response time of storage systems. So far a variety of data storage systems based on redundant arrays of disks have been developed to improve reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may use multiple extents that may be distributed over different physical storage devices in a resource pool. Multiple extents used in one logical disk may be distributed over different physical storage devices in a resource pool. Regarding multiple extents in one stripe of the mapped RAID, they are supposed to be distributed over different physical storage devices, so that when a physical storage device where one extent among the multiple extents resides fails, a rebuild operation may be executed so as to recover data from a physical storage device where other extent resides.

It will be understood that due to the difference in service time and service condition between various storage devices in the resource pool, the various storage devices might have different wear levels. It becomes a technical tough issue regarding how to strike a balance between wear levels of the various storage devices in the resource pool and further increase the overall service life of the resource pool.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, provided is a method for managing a storage system. The method includes: obtaining state information of respective storage devices among a plurality of storage devices in a storage resource pool associated with the storage system, the state information indicating wear levels of the respective storage devices and free spaces in the respective storage devices; in response to receiving a request for allocating a storage space to the storage system from the storage resource pool, determining corresponding available spaces in the respective storage devices on the basis of the wear levels and the free spaces of the respective storage devices, the corresponding available spaces representing storage spaces in the respective storage devices which are allocatable to the storage system; selecting a group of storage devices from the plurality of storage devices on the basis of the corresponding available spaces; and allocating requested storage spaces to the storage system from available spaces in the group of storage devices.

According to a second aspect of the present disclosure, provided is an apparatus for managing a storage system, the apparatus including: at least one processor; a volatile memory; and a memory coupled to the at least one processor, the memory having instructions stored thereon, the instructions, when executed by the at least one processor, causing the apparatus to perform acts. The acts include: obtaining state information of respective storage devices among a plurality of storage devices in a storage resource pool associated with the storage system, the state information indicating wear levels of the respective storage devices and free spaces in the respective storage devices; in response to receiving a request for allocating a storage space to the storage system from the storage resource pool, determining corresponding available spaces in the respective storage devices on the basis of the wear levels and the free spaces of the respective storage devices, the corresponding available spaces representing storage space in the respective storage devices which are allocatable to the storage system; selecting a group of storage devices from the plurality of storage devices on the basis of the corresponding available spaces; and allocating requested storage spaces to the storage system from available spaces in the group of storage devices.

According to a third aspect of the present disclosure, provided is a computer program product tangibly stored on a non-transient computer readable medium and including machine executable instructions for executing a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF EMBODIMENTS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 1A:
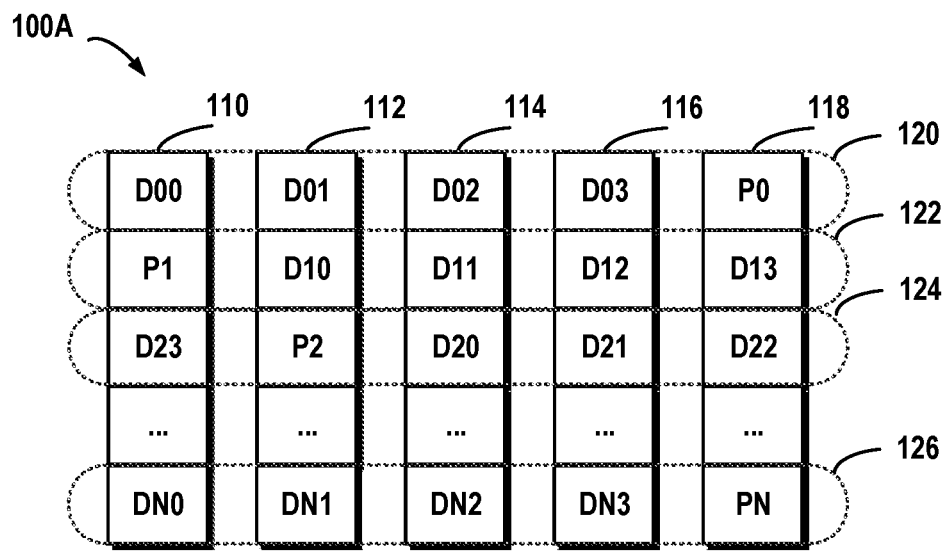
FIGS. 1A and 1B each illustrate a schematic view of a storage system in which a method of the present disclosure may be implemented.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted although five storage devices are schematically shown in FIG. 1A, in other implementations more or less storage devices may be used according to different levels of RAID. Moreover, although FIG. 1A illustrates stripes 120, 122, 124, . . . 126, in other examples the RAID system may further include a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
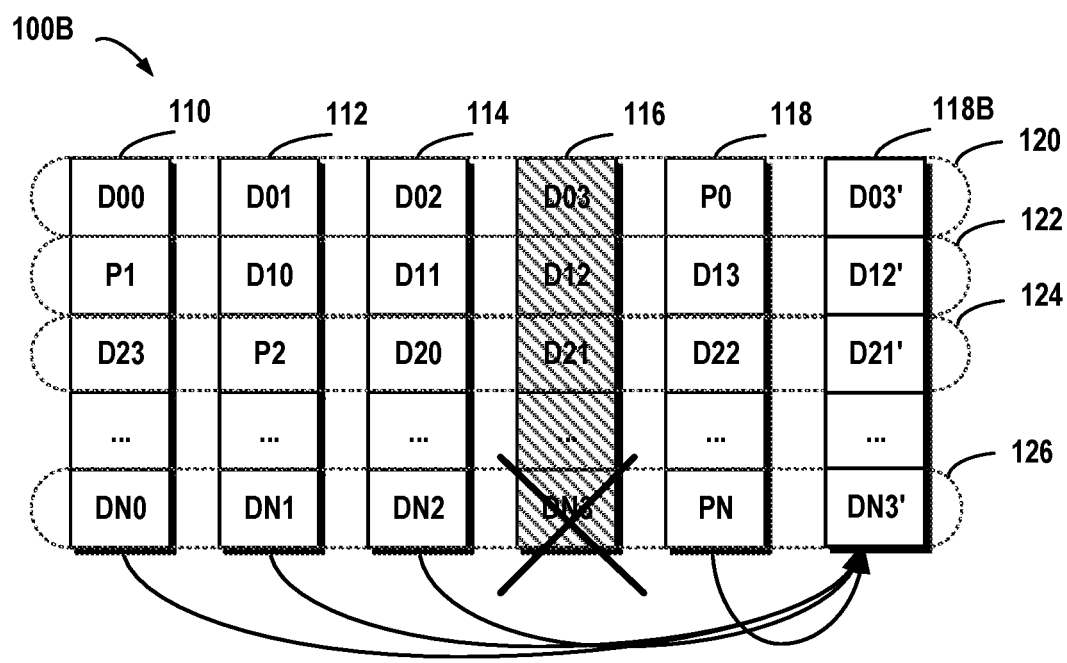

FIG. 1B schematically illustrates a schematic view 100B of rebuilding process of the storage system 100A. As shown in FIG. 1B, when one storage device (e.g. the storage device 116 shown in shades) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
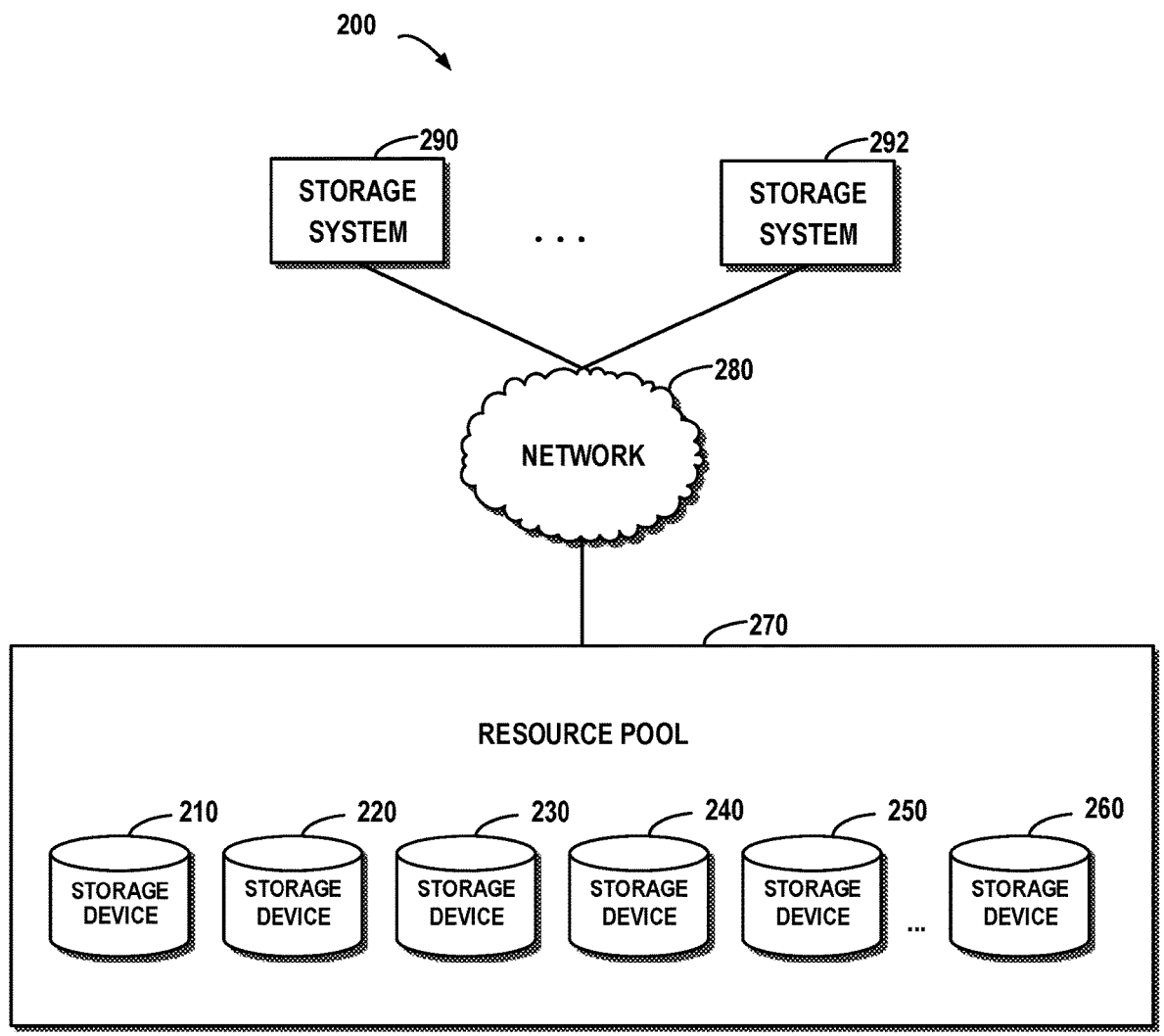
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include multiple physical storage devices 210, 220, 230, 240, 250, . . . , 260. At this point, storage spaces in the multiple storage devices may be allocated to multiple storage systems 290, . . . , 292. At this point, these storage devices 290, . . . , 292 may access the storage space in the various storage devices in the storage resource pool 270 via a network 280.

Figure 3:
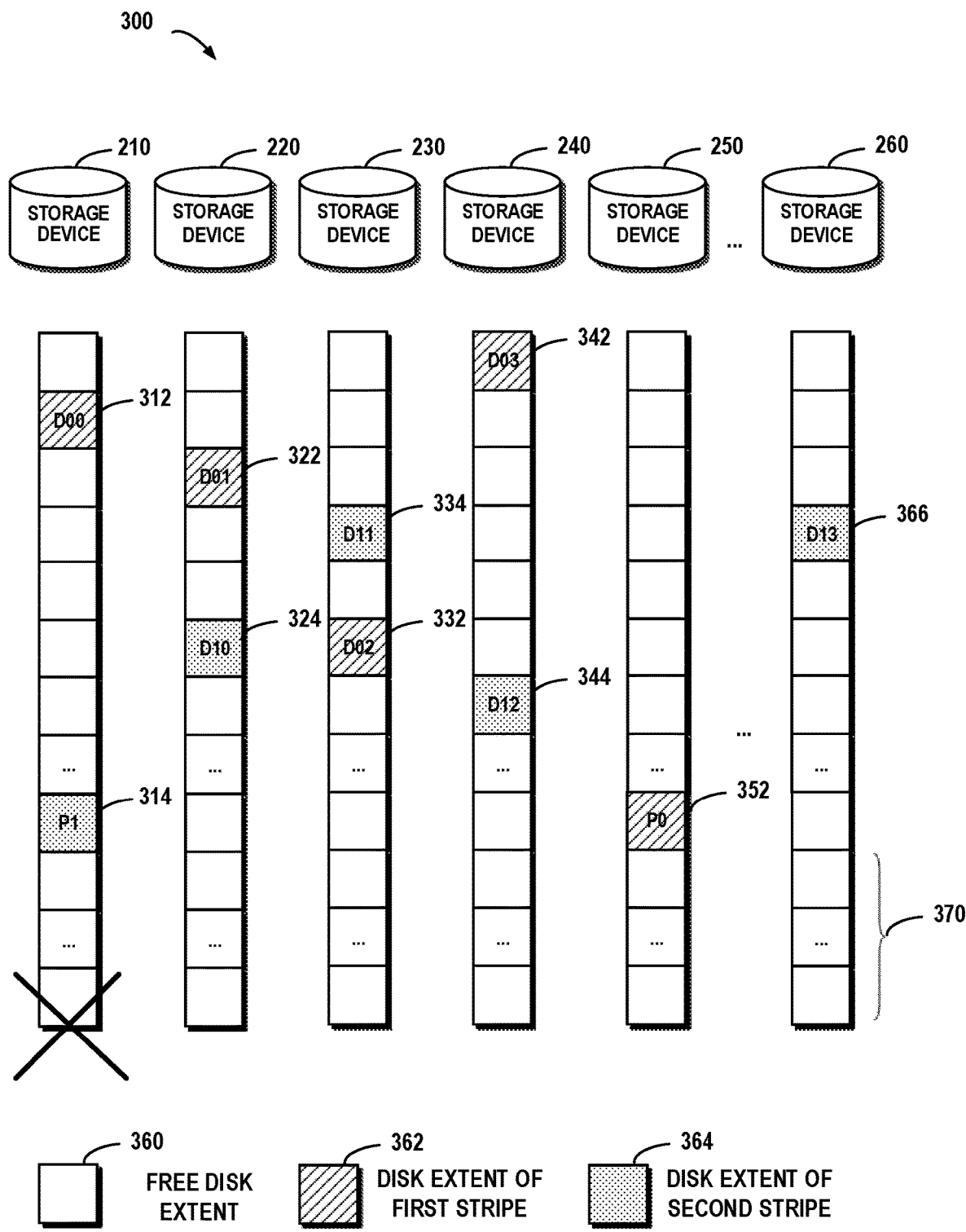
FIG. 3 schematically illustrates a diagram of a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, for example, a schematic view of extents used in each storage device is shown in the upper portion of the storage device. A blank extent (as shown by a legend 360) represents a free extent, an extent (as shown by a legend 362) shown with slashes represents an extent for a first stripe of the storage system 110A in FIG. 1, and an extent (as shown by a legend 364) shown in shades represents an extent for a second stripe of the storage system 110A in FIG. 1. At this point, extents 312, 322, 332, 342 and 352 for the first stripe are for storing data blocks D00, D01, D02, D03 and parity P0 of the first stripe respectively. Extents 324, 334, 344, 366 and 314 for the second stripe are for storing blocks D10, D11, D12, D13 and parity P1 of the second stripe respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

It will be understood that the storage devices 210 to 260 are not indefinitely usable but have specific service lives. Therefore, when managing the storage resource pool 270, the wear level of each storage device has to be monitored. There has been proposed a technical solution for managing the storage resource pool 270 and updating devices on the basis of the highest wear level of each storage device in the storage resource pool 270. However, the technical solution can only provide alerts when some storage device in the resource pool 270 needs to be replaced, but cannot balance wear levels of various storage devices during daily resource use and allocation.

Figure 4:
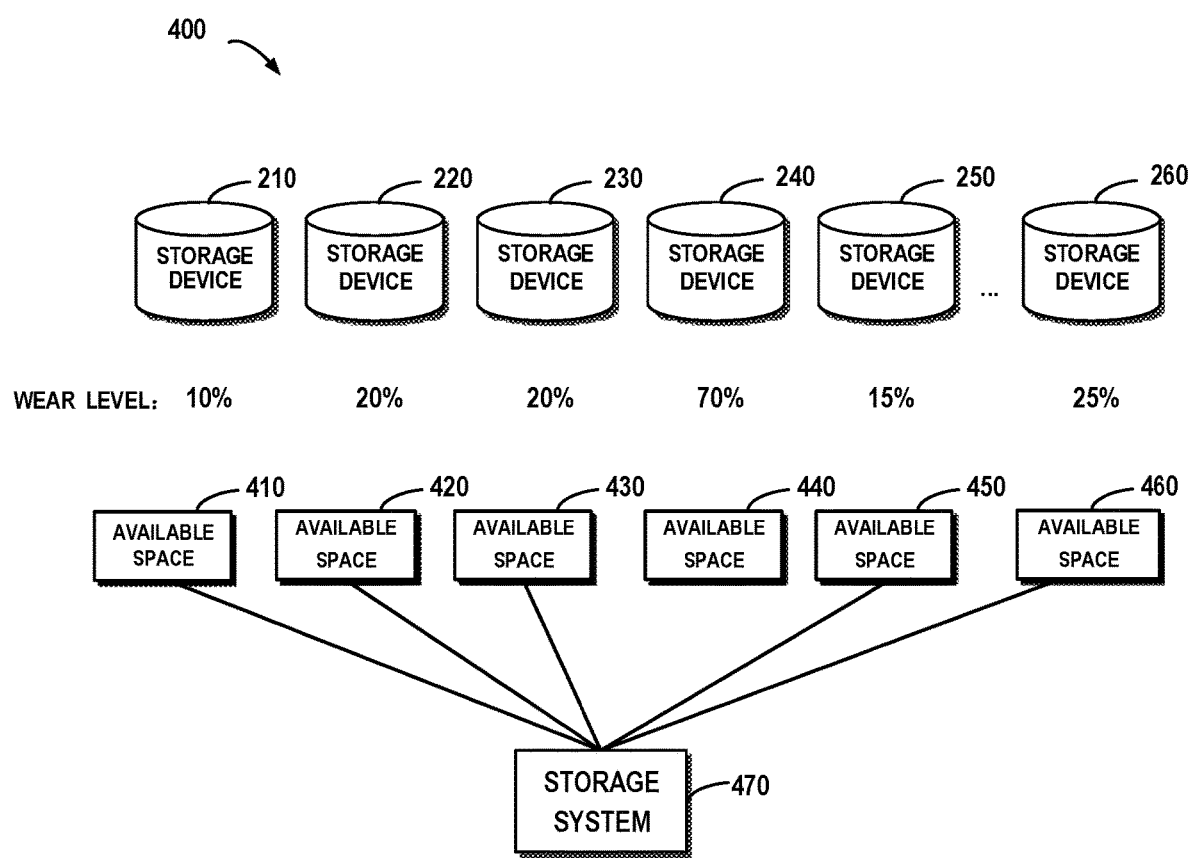
FIG. 4 schematically illustrates an architecture view for managing a storage system according to one implementation of the present disclosure.

To solve the foregoing drawbacks, implementations of the present disclosure provide a method, apparatus and program product for managing a storage system. Specifically, according to one implementation of the present disclosure, provided is a technical solution for managing a storage system. FIG. 4 schematically shows an architecture view 400 for managing a storage system according to one implementation of the present disclosure. In this implementation, by monitoring the wear level of each storage device in the resource pool 270, preferentially the space in a storage device with a lower wear level in the resource pool 270 may be selected to respond to a resource allocation request.

For the convenience of description, a 4D+1P storage system 470 is taken as a specific example. First of all, state information of respective storage devices among the multiple storage devices 210, 220, 230, 240, 250, . . . , 260 in the storage resource pool 270 associated with the storage system 470 may be obtained. Here the state information indicates wear levels of the respective storage devices and free spaces in the same. As shown in FIG. 4, wear levels of the storage devices 210, 220, 230, 240, 250, . . . , 260 are 10%, 20%, 20%, 70%, 15%, . . . , 25% respectively.

In this implementation, if a request for allocating a storage space from the storage resource pool 270 to the storage system 470 is received, then corresponding available spaces in the respective storage devices may be determined on the basis of the wear levels and the free spaces of the respective storage devices. The corresponding available spaces represent storage spaces in the respective storage devices which are allocatable to the storage system. For a given storage device, a capacity of an available space may be inversely proportional to the wear level, and meanwhile it should be ensured that the capacity of the available space is less than the capacity of free spaces in the storage device.

For example, regarding the storage devices 210 and 220, suppose the capacities of free spaces in the two devices are equal and 1 TB, since the storage device 210 has a wear level of 10%, less than the wear level of the storage device 220 which is 20%, the available space of the storage device 210 may be set to 0.5 TB, and the available space of the storage device 220 may be set to 0.25 TB. For another example, if the wear level of a storage device is higher than a predefined threshold, the available space of the storage device may be set to 0 so as to avoid allocating a space in the storage device. As shown in FIG. 4, the storage device 240 has a wear level up to 70%, and if the predefined threshold is 65%, then no more space in the storage device 240 may be allocated. During a subsequent operation of the resource pool 270, the allocated space in the storage device will be treated according to the existing way. Thereby, the wear level of the storage device 240 will increase only as access to the allocated space increases.

It will be understood that the foregoing values are merely one example of an implementation. According to one example implementation of the present disclosure, the available space of each storage device may be determined in other way. Respective available spaces 410, 420, 430, 440, 450, . . . , 460 of the storage devices 210, 220, 230, 240, 250, . . . , 260 may be determined in various ways. Thereby, a storage device with a higher wear level may only expose less available space to the outside, while a storage device with a lower wear level may expose more available space to the outside. Subsequently, a group of storage devices may be selected from the plurality of storage devices on the basis of the corresponding available spaces. Still with reference to FIG. 4, a group of storage devices may be selected from the plurality of storage devices according to capacities of the available spaces 410, 420, 430, 440, 450, . . . , 460. As shown in FIG. 4, a group of the storage devices 210, 220, 230, 250 and 260 may be selected. Next, storage spaces as requested may be allocated to the storage system 470 from the available spaces 410, 420, 430, 450, 460 in the group of the storage devices 210, 220, 230, 250 and 260.

With the foregoing example implementation, by taking into consideration the wear level of each storage device in the resource pool, preferentially a storage device with a lower wear level may be selected from the resource pool 270. On the one hand, more space in the storage device with a lower wear level is put into utilization, which will increase the wear level of this storage device (e.g. to an average level). On the other hand, the available space in a storage device with a higher wear level is allocated as less as possible, and the wear level of the storage device is prevented from being further increased. In this way, wear levels of various storage devices in the resource pool 270 will be made more balanced.

It will be understood that the type of the allocation request is not to be limited in the context of the present disclosure, but the allocation request may be an initial allocation request for allocating a space to a storage system while the storage system is created. Alternatively or additionally, the allocation request may be an extra allocation request when the storage system is short of storage space after running for a while.

Figure 5:
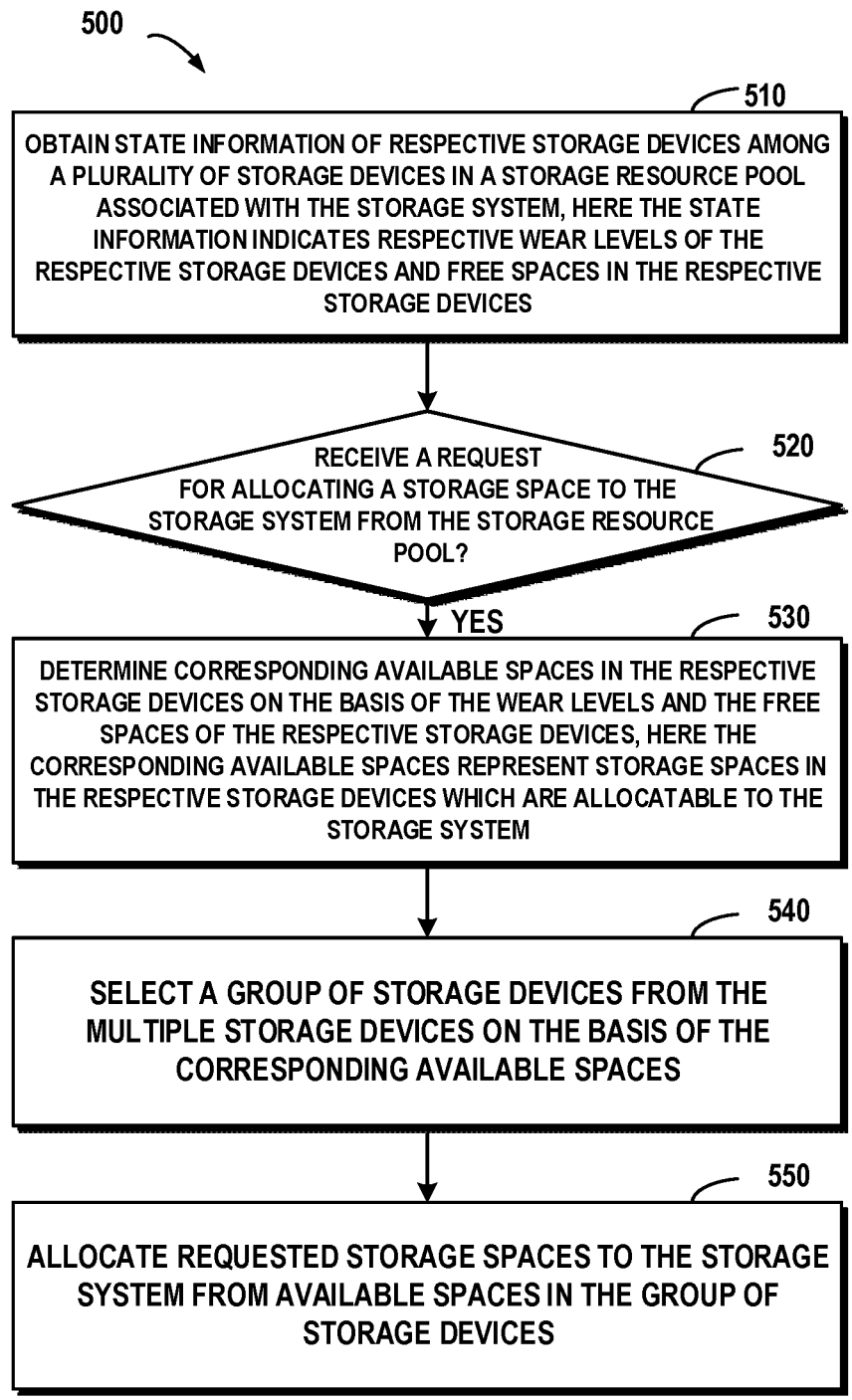
FIG. 5 schematically illustrates a flowchart of a method for managing a storage system according to one implementation of the present disclosure.

With reference to FIG. 5, a detailed description is presented below to more details on how to manage the storage system 470. FIG. 5 schematically shows a flowchart of a method 500 for managing a storage system according to one implementation of the present disclosure. As shown in a block 510, state information of respective storage devices among a plurality of storage devices in the storage resource pool 270 associated with the storage system 470 is obtained, here the state information indicate wear levels of the respective storage devices and free spaces in the respective storage devices.

In one implementation, the wear level may be determined on the basis of a state access interface provided by the storage device. For example, the wear level may be measured on the basis of multiple factors. For example, regarding a solid state drive, its wear level may be determined on the basis of factors such as a failure block count, the remaining life of the solid state drive, and an erase count for the solid state drive, when the solid state drive is accessed. According to one example implementation of the present disclosure, the multiple factors may be normalized, and weights may be assigned to the multiple factors respectively so as to unify wear levels of various storage devices to the same standard. For example, the wear level of a storage device may be represented in a percentage form. With reference to the example in FIG. 4, 10% represents that the storage device 210 has used 10% of its life, and its remaining life is 90%.

As shown in a block 520, it may be judged whether a request for allocating a storage space from the storage resource pool 270 to the storage system 470 has been received. If the judgment results in "yes," then the operational flow proceeds to a block 530. In the block 530, corresponding available spaces in the respective storage devices are determined on the basis of wear levels and free spaces of the respective storage devices. Here the corresponding available spaces represent storage spaces in the respective storage devices which are allocatable to the storage system. The available space in each storage device may be determined on the basis of various criteria. Still with reference to FIG. 5, in a block 540, a group of storage devices are selected from the plurality of storage devices on the basis of the corresponding available space. In a block 550, storage spaces as requested are allocated to the storage system from available spaces in the group of storage devices. More details about the blocks 530 and 540 will be provided with reference to FIG. 6 below.

Figure 6:
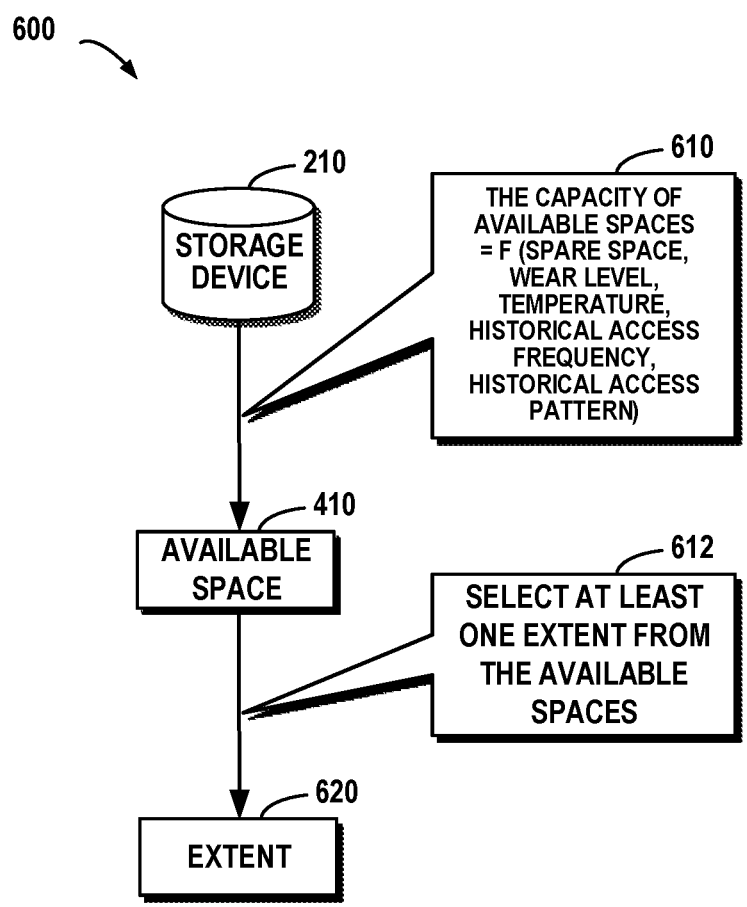
FIG. 6 schematically illustrates a block diagram for selecting, from a storage device among a plurality of storage devices, an extent to be allocated to a storage system according to one implementation of the present disclosure.

FIG. 6 schematically shows a block diagram 600 for selecting from one of plurality of storage devices an extent to be allocated to the storage system 470 according to one implementation of the present disclosure. FIG. 6 only illustrates operations to the storage device 210, and those skilled in the art can determine an available space in other storage device on the basis of the principles described in the present disclosure. As depicted, regarding the storage device 210, as shown by an arrow 610, the available space 410 may be determined on the basis of free spaces, wear levels, the temperature, the historical access frequency and the historical access pattern of the storage device 210.

According to one example implementation of the present disclosure, regarding a storage device among the plurality of storage devices, an available space in the storage device may be determined on the basis of wear levels. In this implementation, the available space may be selected from free spaces, wherein the capacity of the free spaces is inversely proportional to the wear level. It will be understood if the space in a storage device with a higher wear level is continually allocated, then the wear level of the storage device will be increased further. With the foregoing example implementation, by setting the capacity of the available space to be inversely proportional to the wear level, the storage device with a higher wear level may be caused to expose less space to the outside. Meanwhile a storage device with a lower wear level may be caused to expose more space to the outside for allocation. In this way, a balance may be maintained between wear levels of various storage devices in the resource pool 270, and further the overall life of the resource pool 270 will be improved.

According to one example implementation of the present disclosure, an average wear level may further be determined on the basis of wear levels of the various storage devices, and the capacity of the available space 410 may be determined on the basis of the wear level of the storage device 210 and the average wear level. For example, the available space of the $i^{th}$ storage device in the resource pool 270 may be determined from Formula 1 below:

$$S_i = S_{pi} * f_w(W_i, W_a) \qquad \text{Formula 1}$$

Wherein $S_i$ denotes the available space of the $i^{th}$ storage device in the resource pool 270, $S_{pi}$ denotes the free spaces in the $i^{th}$ storage device in the resource pool 270, $W_i$ denotes the wear level of the $i^{th}$ storage device, $W_a$ denotes the average wear level of the plurality of storage devices in the resource pool 270, and $f_w$ denotes a function for determining an allocatable capacity in the $i^{th}$ storage device on the basis of $W_i$ and $W_a$.

Those skilled in the art may define various rules for representing $f_w$. For example, it may be defined in a simple example: if $W_i$ is larger than or equals to $W_a$, then $f_w=0$; otherwise, $f_w$ will be set to a predefined proportion, e.g. 20%. Alternatively or additionally, $f_w$ may further be set depending on other configuration of the storage device.

According to one example implementation of the present disclosure, the state information of the storage device further includes temperature information of the storage device. The temperature information may represent the state information of the storage device to some degree. Generally, the higher the temperature of a storage device, the higher a workload of the storage device, and the lower the temperature of a storage device, the lower a workload of the storage device. Therefore, regarding the storage device among the plurality of storage devices, the available space may be selected from the free spaces on the basis of the temperature information. In this implementation, the capacity of the available space may be set to be inversely proportional to the temperature information.

It will be understood if the space in a storage device with higher temperature is continued to be allocated, the workload of the storage device will be increased, and further the temperature will rise and the failure probability of the storage device will be increased. With the foregoing example implementation, by setting the capacity of the available space to be inversely proportional to the temperature information, a storage device with higher temperature may be caused to expose less space to the outside, while a storage device with lower temperature may be caused to expose more space to the outside for allocation. In this way, a balance will be maintained between temperature levels of various storage devices in the resource pool 270, and further the overall life of the resource pool will be prolonged.

According to one example implementation of the present disclosure, average temperature may further be determined on the basis of temperature of the various storage devices, and the capacity of the available space 410 may be determined on the basis of the temperature of the storage device 210 and the average temperature. For example, the available space of the $i^{th}$ storage device in the resource pool 270 may be determined from Formula 2 below:

$$S_i = S_{pi} * f_T(T_i, T_a) \qquad \text{Formula 2}$$

Wherein $S_i$ denotes the available space of the $i^{th}$ storage device in the resource pool 270, $S_{pi}$ denotes the free spaces in the $i^{th}$ storage device in the resource pool 270, $T_i$ denotes the temperature of the $i^{th}$ storage device, $T_a$ denotes the average temperature of the plurality of storage devices in the resource pool 270, and $f_T$ denotes a function for determining an allocatable capacity in the $i^{th}$ storage device on the basis of $T_i$ and $T_a$.

Those skilled in the art may define various rules for representing $f_T$. For example, it may be defined in a simple example: if $T_i$ is larger than or equals to $T_a$, then $f_T=0$; otherwise, $f_T$ will be set to a predefined proportion, e.g. 20%. Alternatively or additionally, $f_T$ may further be set depending on other configuration of the storage device.

According to one example implementation of the present disclosure, the state information of the storage device further includes historical access frequency of the storage device. It will be understood that the historical access frequency may represent the frequency at which the storage device has been accessed in a past period of time. If the historical access frequency is high, this means that the storage device has been frequently accessed in the past, and further it may be inferred reasonably that data stored in the storage device belong to "hot" data and the storage device will be frequently accessed for some time in the future. Therefore, regarding the storage device among the plurality of storage devices, the available space may be selected from the free spaces on the basis of the historical access frequency. In this implementation, the capacity of the available space may be set to be inversely proportional to the historical access frequency.

It will be understood if the space in a storage device with higher historical access frequency is continued to be allocated, the workload of the storage device will be increased, and further the access frequency will be increased, and the workload, wear level and failure possibility of the storage device will also be increased. With the foregoing example implementation, by setting the capacity of the available space to be inversely proportional to the historical access frequency, a storage device with higher historical access frequency may be caused to expose less space to the outside, while a storage device with lower historical access frequency may be caused to expose more space to the outside for allocation. In this way, a balance will be maintained between access frequencies of various storage devices in the resource pool 270, and further the overall life of the resource pool will be prolonged.

According to one example implementation of the present disclosure, average access frequency may further be determined on the basis of historical access frequency of the various storage devices, and the capacity of the available space 410 may be determined on the basis of the historical access frequency of the storage device 210 and the average access frequency. For example, the available space of the $i^{th}$ storage device in the resource pool 270 may be determined from Formula 3 below:

$$S_i = S_{pi} * f_F(F_i, F_a) \qquad \text{Formula 3}$$

Wherein $S_i$ denotes the available space of the $i^{th}$ storage device in the resource pool 270, $S_{pi}$ denotes the free spaces in the $i^{th}$ storage device in the resource pool 270, $F_i$ denotes the historical access frequency of the $i^{th}$ storage device, $F_a$ denotes the average historical access frequency of the plurality of storage devices in the resource pool 270, and $f_F$ denotes a function for determining an allocatable capacity in the $i^{th}$ storage device on the basis of $F_i$ and $F_a$.

Those skilled in the art may define various rules for representing $f_F$. For example, it may be defined in a simple example: if $F_i$ is larger than or equals to $F_a$, then $f_F=0$; otherwise, $f_F$ will be set to a predefined proportion, e.g. 20%. Alternatively or additionally, $f_F$ may further be set depending on other configuration of the storage device.

According to one example implementation of the present disclosure, the state information further includes a historical access pattern of the storage device. Here the historical access frequency indicates whether historical writes to the storage device are random writes or sequential writes. Generally, the wear level of the storage device mainly depends on writes, while reads only exert a marginal impact on the wear level of the storage device. Therefore, historical reads may be neglected, and consideration is only given to whether writes are random writes or sequential writes.

It will be understood that the impact of random writes on the life of the storage device is much higher than that of sequential writes. Therefore, if it is determined that the historical access pattern indicates random writes, then the capacity of the available space may be reduced; if it is determined that the access pattern indicates sequential writes, then the capacity of the available space may be increased. In this way, a storage device that has gone through more random writes may be caused to expose less space to the outside, while a storage device that has gone through more sequential writes may be caused to expose more space to the outside for allocation. In this way, a balance will be maintained between access patterns of various storage devices in the resource pool 270, and further the overall life of the resource pool will be prolonged.

According to one example implementation of the present disclosure, an average access pattern may further be determined on the basis of historical access patterns of the various storage devices (for example, statistics may be made on the proportion of writes in two patterns), and the capacity of the available space 410 may be determined on the basis of the historical access pattern of the storage device 210 and the average access pattern. For example, the available space of the $i^{th}$ storage device in the resource pool 270 may be determined from Formula 4 below:

$$S_i = S_{pi} * f_P(P_i, P_a) \qquad \text{Formula 4}$$

Wherein $S_i$ denotes the available space of the $i^{th}$ storage device in the resource pool 270, $S_{pi}$ denotes the free spaces in the $i^{th}$ storage device in the resource pool 270, $P_i$ denotes the historical access pattern of the $i^{th}$ storage device, $P_a$ denotes the average historical access pattern of the plurality of storage devices in the resource pool 270, and $f_P$ denotes a function for determining an allocatable capacity in the $i^{th}$ storage device on the basis of $P_i$ and $P_a$. Those skilled in the art may define various rules for representing $f_P$, which is not detailed here.

According to one example implementation of the present disclosure, by taking into consideration the foregoing Formulas 1 to 4, the available space of the $i^{th}$ storage device in the resource pool 270 may be determined from Formula 5 below:

$$S_i = S_{pi} * f_w(W_i, W_a) * (T_i, T_a) * f_F(F_i, F_a) * f_P(P_i, P_a) \quad \text{Formula 5}$$

It will be understood that examples of determining the capacity of the available space have been illustrated on the basis of Formulas 1 to 4 above. The meaning of each variable in Formula 5 remains the same as that in Formulas 1 to 4, which is not detailed here. According to one example implementation of the present disclosure, the capacity of the available space may further be determined on the basis of two or more of Formulas 1 to 4.

With reference to FIG. 6 still, as shown by an arrow 612, at least one extent may be selected from the available space 410 so as to be allocated to the storage system 470. It will be understood that during the selection, consideration needs to be given to the capacity of the available space in each storage device in the resource pool 270, so that the capacity of storage spaces provided by selected extents can satisfy the request. With the foregoing example implementation, it may be guaranteed that the total capacity of the allocation request can be satisfied.

According to one example implementation of the present disclosure, the group of storage devices may be selected in order of capacities of the corresponding available spaces. For example, capacities of determined available spaces of various storage devices in the resource pool 270 may be ranked, and preferentially a storage device with a high-capacity available space may be selected. With the foregoing example implementation, a balance between free spaces in various storage devices in the resource pool 270 may be guaranteed as far as possible while a balance between wear levels of the various storage devices is guaranteed. Further, it may be avoided that the free spaces in a given storage device in the resource pool 270 wears out whereas there is a big surplus of free spaces in other storage devices.

Figure 7:
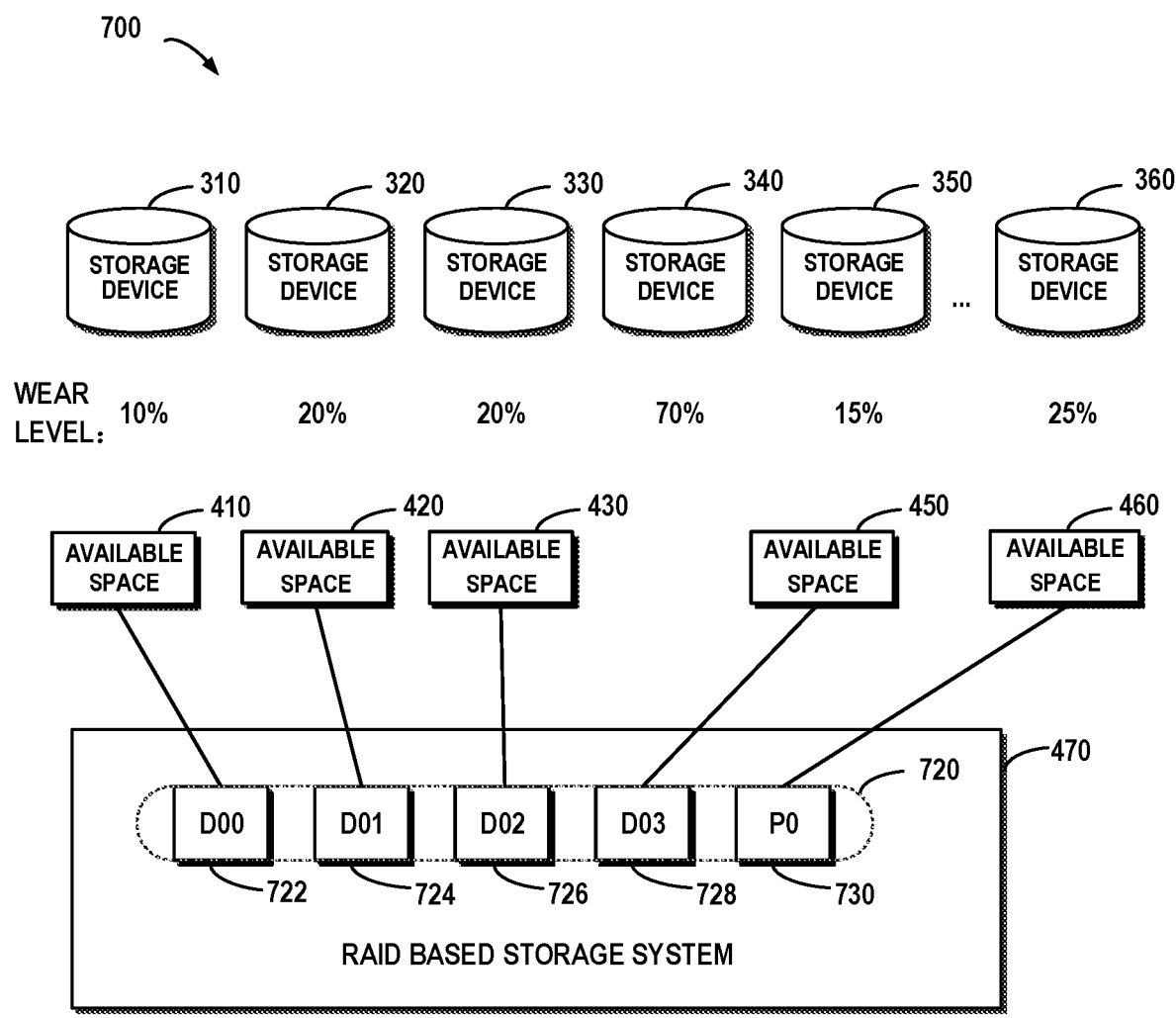
FIG. 7 schematically illustrates a flowchart of a method for allocating storage spaces from a plurality of storage devices to a RAID based storage system according to one implementation of the present disclosure.

According to one example implementation of the present disclosure, the storage system 470 is a Redundant Array of Independent Disks. In this implementation, a group of storage devices with a number that meets the requirement of the type of the Redundant Array of Independent Disks may be selected. With reference to FIG. 7, description is presented below to more details about the operational process of the RAID based storage system 470. FIG. 7 schematically shows a block diagram 700 for allocating a storage space from plurality of storage devices to the RAID based storage system 470 according to one implementation of the present disclosure. As depicted, the storage system 470 is a RAID based storage system, and at this point the allocation request is a request for allocating various extents in a first stripe 720 in the storage system 470.

The available spaces 410, 420, 430, 450 and 460 in various storage devices in the resource pool 270 may be determined using the above described method. Further, it may be determined in view of the capacity required by the allocation request how much storage space is to be allocated from each storage device. Suppose the allocation request requires an allocation of one stripe from the resource pool 270, the configuration of the storage system 710 defines that each extent in the stripe 720 has a size of 1 GB, and also an extent in each storage device in the resource pool has a size of 1 GB. At this point, one extent may be respectively selected from each of the available spaces 410, 420, 430, 450 and 460 to form the stripe 720.

As shown in FIG. 7, an extent 722 may be selected from the available space 410 to store data D00, an extent 724 may be selected from the available space 420 to store data D01, an extent 726 may be selected from the available space 430 to store data D02, an extent 728 may be selected from the available space 450 to store data D03, and an extent 730 may be selected from the available space 460 to store data P0. It will be understood that FIG. 7 illustrates how to allocate a storage space to a RAID based storage system by taking a 4D+1P RAID storage system 710 as an example. According to one example implementation of the present disclosure, the storage system may further be provided in other form, at which point those skilled in the art may affect the allocation of a storage space according to the principles described in the present disclosure.

According to one example implementation of the present disclosure, for another instance, suppose the allocation request requires an allocation of two stripes from the resource pool 270, then at this point two extents may be respectively selected from each of the available spaces 410, 420, 430, 450 and 460 to form two stripes in a similar way. According to one example implementation of the present disclosure, the capacity of an extent in the stripe may differ from that of an extent in the storage device. Those skilled in the art may determine how to select a suitable number of extents from various available spaces on the basis of the principles of the present disclosure.

According to one example implementation of the present disclosure, an average wear level of the plurality of storage devices may be determined on the basis of wear levels of respective storage devices among the plurality of storage devices; and the average wear level may be updated on the basis of the capacity of a storage space associated with the request and the total capacity of the plurality of storage devices, and the updated value may be used as the overall wear level of the resource pool 270. With the foregoing example implementation, the overall wear level of various storage devices in the resource pool 270 may be evaluated in a more accurate way. When the overall wear level determined according to the implementation of the present disclosure reaches a predefined threshold, a warning message may be sent to the administrator so as to remind the administrator to perform operations such as data backup and storage device replacement.

According to one example implementation of the present disclosure, the wear level of each storage device in the resource pool 270 may further be detected. Here the detection may be conducted upon receiving a detection request, or the detection may be conducted periodically. If it is determined that first state information of a first storage device among the plurality of storage devices indicates a first wear level of the first storage device is higher than a predefined threshold, at least one part of extents in the first storage device may be moved to a second storage device among the plurality of storage devices. Further, since a mapping table of the storage system records a physical address of each extent in the storage system, the mapping table of the storage system needs to be updated on the basis of addresses of the moved at least one part of extents in the second storage device.

With the foregoing example implementation, data access to the first storage device may be directed to the second storage device with a lower wear level, and further it may be guaranteed that the access amount of the first storage device is reduced and the increase speed of the wear level of the first storage device slows down. On the other hand, since the wear level of the second storage device is lower, frequent access to the second storage device in a future period of time will not increase the wear level of the second storage device to a degree for which replacement is required. In this way, wear levels of various storage devices in the resource pool 270 may be balanced, and further the overall life of the resource pool may be prolonged.

Figure 8:
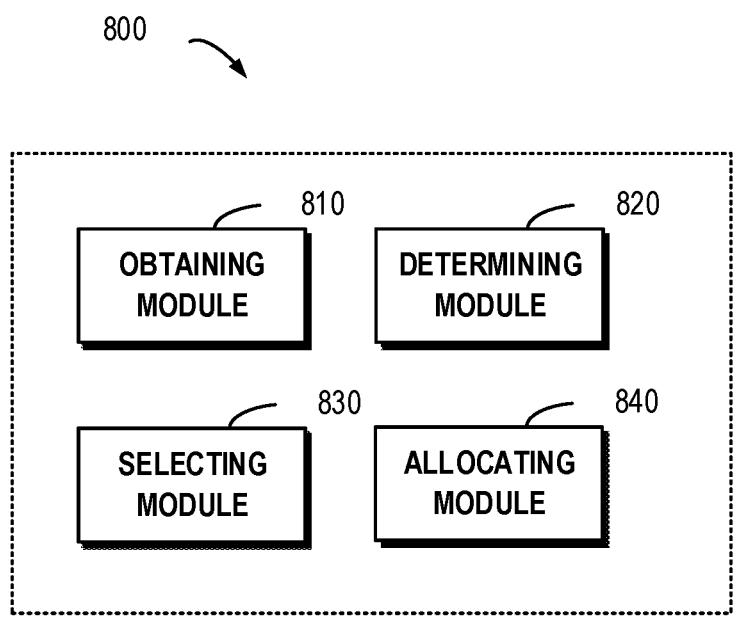
FIG. 8 schematically illustrates a block diagram of an apparatus for managing a storage system according to one example implementation of the present disclosure.

While examples of the method according to the present disclosure have been described in detail with reference to FIGS. 2 to 7, an implementation of a corresponding apparatus will be described below with reference to FIG. 8. FIG. 8 schematically shows a block diagram of an apparatus 800 for managing a storage system according to one example implementation of the present disclosure. Specifically, the apparatus 800 includes: an obtaining module 810 configured to obtain state information of respective storage devices among a plurality of storage devices in a storage resource pool associated with the storage system, the state information indicating wear levels of the respective storage devices and free spaces in the respective storage devices; a determining module 820 configured to, in response to receiving a request for allocating a storage space to the storage system from the storage resource pool, determine corresponding available spaces in the respective storage devices on the basis of the wear level and the free spaces of the respective storage devices, the corresponding available space representing storage spaces in the respective storage devices which are allocatable to the storage system; a selecting module 830 configured to select a group of storage devices from the plurality of storage devices on the basis of the corresponding available space; and an allocating module 840 configured to allocate requested storage spaces to the storage system from available spaces in the group of storage devices.

Figure 9:
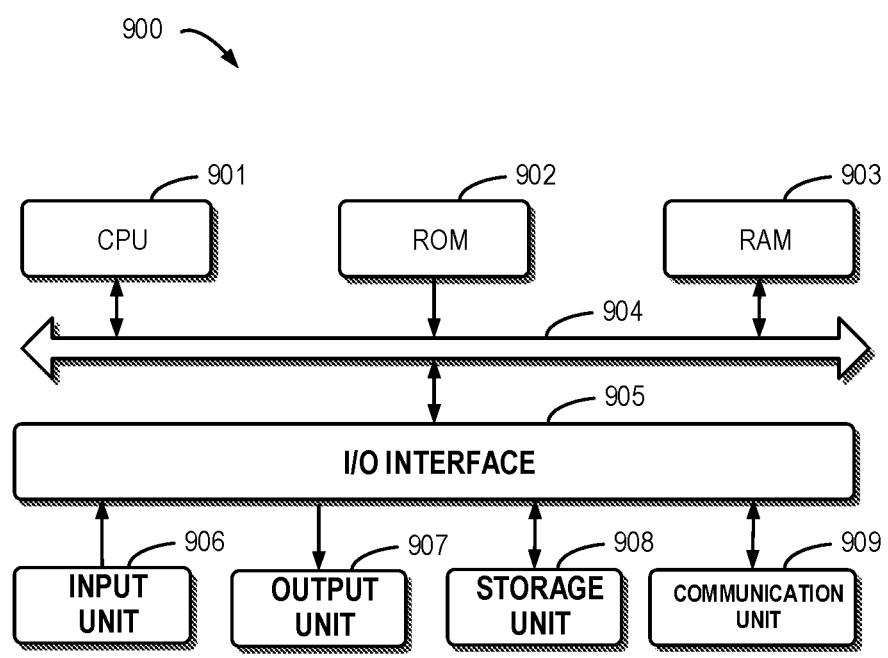
FIG. 9 schematically illustrates a block diagram of an apparatus for managing a storage system according to one example implementation of the present disclosure.

FIG. 9 schematically shows a block diagram of an apparatus 900 for managing a storage system according to one example implementation of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904. In accordance with certain embodiments, other types of computerized equipment/circuitry are used in place of and/or in combination with the computerized circuitry described above.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the method 500, can also be executed by the processing unit 901. For example, in some implementations, the method 500 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described method 500 can be implemented. Alternatively, in other implementations, the CPU 901 also can be configured in other suitable manners to realize the above procedure/method.

According to one example implementation of the present disclosure, there is provided an apparatus for managing a storage system, the apparatus including: at least one processor; a volatile memory; and a memory coupled to the at least one processor, the memory having instructions stored thereon, the instructions, when executed by the at least one processor, causing the apparatus to perform acts. The acts include: obtaining state information of respective storage devices among a plurality of storage devices in a storage resource pool associated with the storage system, the state information indicating wear levels of the respective storage devices and free spaces in the respective storage devices; in response to receiving a request for allocating a storage space to the storage system from the storage resource pool, determining corresponding available spaces in the respective storage devices on the basis of the wear level and the free spaces of the respective storage devices, the corresponding available spaces representing storage spaces in the respective storage devices which are allocatable to the storage system; selecting a group of storage devices from the plurality of storage devices on the basis of the corresponding available space; and allocating requested storage spaces to the storage system from available spaces in the group of storage devices.

According to one example implementation of the present disclosure, determining corresponding available spaces in the respective storage devices includes: regarding a storage device among the plurality of storage devices, determining an available space in the storage device, including: selecting an available space from the free spaces on the basis of wear levels in state information of the storage device, where the capacity of the available space is inversely proportional to the wear level.

According to one example implementation of the present disclosure, the state information of the storage device further includes temperature information of the storage device, and determining an available space in the storage device further includes: selecting the available space from the free spaces on the basis of the temperature information, wherein the capacity of the available space is inversely proportional to the temperature information.

According to one example implementation of the present disclosure, the state information of the storage device further includes historical access frequency of the storage device, and determining an available space in the storage device further includes: selecting the available space from the free spaces on the basis of the historical access frequency, wherein the capacity of the available space is inversely proportional to the historical access frequency.

According to one example implementation of the present disclosure, the state information of the storage device further includes a historical access pattern of the storage device, the historical access pattern indicating whether historical writes to the storage device are random writes or sequential writes, and determining an available space in the storage device further includes: in response to the historical access pattern indicating random writes, reducing the capacity of the available space; and in response to the historical access pattern indicating sequential writes, increasing the capacity of the available space.

According to one example implementation of the present disclosure, selecting a group of storage devices from the plurality of storage devices on the basis of the corresponding available space includes: selecting the group of storage devices according to an order of capacities of the corresponding available spaces.

According to one example implementation of the present disclosure, allocating a requested storage space to the storage system from the group of storage devices includes: selecting at least one extent from an available space of each storage device in the group of storage devices so that the capacity of a storage space provided by the selected extent meets the request.

According to one example implementation of the present disclosure, the storage system is a Redundant Array of Independent Disks, wherein selecting the group of storage devices includes: selecting a group of storage devices with a number that meets the requirement of the type of the Redundant Array of Independent Disks.

According to one example implementation of the present disclosure, an average wear level of the plurality of storage devices is determined on the basis of wear levels of respective storage devices among the plurality of storage devices; and the average wear level is updated on the basis of the capacity of a storage space associated with the request and the total capacity of the plurality of storage devices.

According to one example implementation of the present disclosure, in response to determining that first state information of a first storage device among the plurality of storage devices indicates a first wear level of the first storage device is higher than a predefined threshold, at least one part of extents in the first storage device are moved to a second storage device among the plurality of storage devices; and a mapping table of the storage system is updated on the basis of addresses of the at least one part of extents in the second storage device, the mapping table indicating addresses of respective extents in the plurality of storage devices in the storage system.

According to one example implementation of the present disclosure, there is provided a computer program product. The computer program product is tangibly stored on a computer readable medium and includes machine executable instructions which, when executed, cause a machine to implement the method according to the present disclosure.

According to one example implementation of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, the method comprising:
    obtaining state information of respective storage devices among a plurality of storage devices in a storage resource pool associated with the storage system, the state information indicating respective wear levels of the respective storage devices and free spaces in the respective storage devices;
    in response to receiving a request for allocating a storage space to the storage system from the storage resource pool, determining corresponding available spaces in the respective storage devices on the basis of the wear levels and the free spaces of the respective storage devices, the corresponding available spaces representing storage spaces in the respective storage devices which are allocatable to the storage system;
    selecting a group of storage devices from the multiple storage devices on the basis of the corresponding available spaces; and
    allocating requested storage spaces to the storage system from available spaces in the group of storage devices;
    wherein determining corresponding available spaces in the respective storage devices comprises:
        regarding a storage device among the plurality of storage devices, determining an available space in the storage device, comprising:
            selecting an available space from the free spaces on the basis of a wear level in state information of the storage device, wherein a capacity of the available space is inversely proportional to the wear level, wherein the state information of the storage device further comprises a historical access pattern of the storage device, the historical access pattern indicating whether historical writes to the storage device are random writes or sequential writes, and
            changing the capacity of the available space based on whether the historical writes to the storage device are random writes or sequential writes.

2. The method according to claim 1, wherein the state information of the storage device further comprises temperature information of the storage device, and
    wherein selecting the available space from the free spaces is further based on the temperature information, wherein the capacity of the available space is inversely proportional to the temperature information.

3. The method according to claim 1, wherein the state information of the storage device further comprises historical access frequency of the storage device, and
    wherein selecting the available space from the free spaces is further based on the historical access frequency, wherein the capacity of the available space is inversely proportional to the historical access frequency.

4. The method according to claim 1, wherein changing the capacity of the available space based on whether the historical writes to the storage device are random writes or sequential writes comprises:
    in response to the historical access pattern indicating random writes, reducing the capacity of the available space; and
    in response to the historical access pattern indicating sequential writes, increasing the capacity of the available space.

5. The method according to claim 1, wherein selecting a group of storage devices from the plurality of storage devices on the basis of the corresponding available spaces comprises:
    selecting the group of storage devices according to an order of capacities of the corresponding available spaces.

6. The method according to claim 1, wherein allocating requested storage spaces to the storage system from the group of storage devices comprises:
    selecting at least one extent from an available space of each storage device in the group of storage devices so that a capacity of a storage space provided by the selected extent meets the request.

7. The method according to claim 6, wherein the storage system is a Redundant Array of Independent Disks, wherein selecting the group of storage devices comprises: selecting a group of storage devices with a number that meets the requirement of the type of the Redundant Array of Independent Disks.

8. The method according to claim 7, further comprising:
determining an average wear level of the plurality of storage devices on the basis of wear levels of respective storage devices among the plurality of storage devices; and
updating the average wear level on the basis of the capacity of a storage space associated with the request and a total capacity of the plurality of storage devices.

9. The method according to claim 1, further comprising:
in response to determining that first state information of a first storage device among the plurality of storage devices indicates a first wear level of the first storage device is higher than a predefined threshold,
moving at least one part of extents in the first storage device to a second storage device among the plurality of storage devices; and
updating a mapping table of the storage system on the basis of addresses of the moved at least one part of extents in the second storage device, the mapping table indicating addresses of respective extents in the plurality of storage devices in the storage system.

10. The method according to claim 1, wherein each storage device has a respective wear level indicating a degree of wear for that storage device; and
wherein determining the corresponding available spaces in the respective storage devices provides a respective available space amount for each storage device based on the respective wear level indicating the degree of wear for that storage device.

11. The method according to claim 10, wherein selecting the group of storage devices includes:
selecting, as members of the group, (i) a first storage device having a first wear level and a first amount of available space selected from first free space in the first storage device and (ii) a second storage device having a second wear level and a second amount of available space selected from second free space in the second storage device;
wherein the first wear level of the first storage device is higher than the second wear level of the second storage device indicating that the first storage device has a higher degree of wear than the second storage device; and
wherein the first amount of available space selected from first free space in the first storage device is lower than the second amount of available space selected from second free space in the second storage device to reduce access to the first storage device compared to the second storage device for balancing wear among the storage devices.

12. An apparatus for managing a storage system, comprising:
at least one processor;
a volatile memory; and
a memory coupled to the at least one processor, the memory having instructions stored thereon, the instructions, when executed by the at least one processor, causing the apparatus to perform acts for managing a storage system, the acts including:
obtaining state information of respective storage devices among a plurality of storage devices in a storage resource pool associated with the storage system, the state information indicating wear levels of the respective storage devices and free spaces in the respective storage devices;
in response to receiving a request for allocating a storage space to the storage system from the storage resource pool, determining corresponding available spaces in the respective storage devices on the basis of the wear level and the free spaces of the respective storage devices, the corresponding available spaces representing storage spaces in the respective storage devices which are allocatable to the storage system;
selecting a group of storage devices from the plurality of storage devices on the basis of the corresponding available spaces; and
allocating requested storage spaces to the storage system from available spaces in the group of storage devices;
wherein determining corresponding available spaces in the respective storage devices comprises:
regarding a storage device among the plurality of storage devices, determining an available space in the storage device, comprising:
selecting an available space from the free spaces on the basis of a wear level in state information of the storage device, wherein a capacity of the available space is inversely proportional to the wear level, wherein the state information of the storage device further comprises a historical access pattern of the storaqe device, the historical access pattern indicating whether historical writes to the storage device are random writes or sequential writes, and
changing the capacity of the available space based on whether the historical writes to the storage device are random writes or sequential writes.

13. The apparatus according to claim 12, wherein the state information of the storage device further comprises temperature information of the storage device, and
wherein selecting the available space from the free spaces is further based on the temperature information, wherein the capacity of the available space is inversely proportional to the temperature information.

14. The apparatus according to claim 12, wherein the state information of the storage device further comprises historical access frequency of the storage device, and
wherein selecting the available space from the free spaces is further based on the historical access frequency, wherein the capacity of the available space is inversely proportional to the historical access frequency.

15. The apparatus according to claim 12, wherein changing the capacity of the available space based on whether the historical writes to the storage device are random writes or sequential writes comprises:
in response to the historical access pattern indicating random writes, reducing the capacity of the available space; and
in response to the historical access pattern indicating sequential writes, increasing the capacity of the available space.

16. The apparatus according to claim 12, wherein selecting a group of storage devices from the plurality of storage devices on the basis of the corresponding available spaces comprises:
selecting the group of storage devices according to an order of capacities of the corresponding available spaces.

17. The apparatus according to claim 12, wherein allocating requested storage spaces to the storage system from the group of storage devices comprises:

selecting at least one extent from an available space of each storage device in the group of storage devices so that a capacity of a storage space provided by the selected extent meets the request.

18. The apparatus according to claim 17, wherein the storage system is a Redundant Array of Independent Disks, wherein selecting the group of storage devices comprises:
selecting a group of storage devices with a number that meets the requirement of the type of the Redundant Array of Independent Disks.

19. The apparatus according to claim 18, the acts further comprising:

determining an average wear level of the plurality of storage devices on the basis of wear levels of respective storage devices among the plurality of storage devices; and updating the average wear level on the basis of the capacity of a storage space associated with the request and the total capacity of the plurality of storage devices.

20. The apparatus according to claim 12, the acts further comprising: in response to determining that first state information of a first storage device among the plurality of storage devices indicates a first wear level of the first storage device is higher than a predefined threshold, moving at least one part of extents in the first storage device to a second storage device among the plurality of storage devices; and updating a mapping table of the storage system on the basis of addresses of the moved at least one part of extents in the second storage device, the mapping table indicating addresses of respective extents in the plurality of storage devices in the storage system.

21. A computer program product having a non-transitory computer readable medium which stores a set of instructions to manage a storage system; the set of instructions, when carried out by computerized circuitry, causing the computerized circuitry to perform a method of:

obtaining state information of respective storage devices among a plurality of storage devices in a storage resource pool associated with the storage system, the state information indicating respective wear levels of the respective storage devices and free spaces in the respective storage devices;

in response to receiving a request for allocating a storage space to the storage system from the storage resource pool, determining corresponding available spaces in the respective storage devices on the basis of the wear levels and the free spaces of the respective storage devices, the corresponding available spaces representing storage spaces in the respective storage devices which are allocatable to the storage system;

selecting a group of storage devices from the multiple storage devices on the basis of the corresponding available spaces; and allocating requested storage spaces to the storage system from available spaces in the group of storage devices;

wherein determining corresponding available spaces in the respective storage devices comprises:

regarding a storage device among the plurality of storage devices, determining an available space in the storage device, comprising:

selecting an available space from the free spaces on the basis of a wear level in state information of the storage device, wherein a capacity of the available space is inversely proportional to the wear level, wherein the state information of the storage device further comprises a historical access pattern of the storaqe device, the historical access pattern indicatinq whether historical writes to the storage device are random writes or sequential writes, and changing the capacity of the available space based on whether the historical writes to the storage device are random writes or sequential writes.

* * * * *